Patented May 8, 1923.

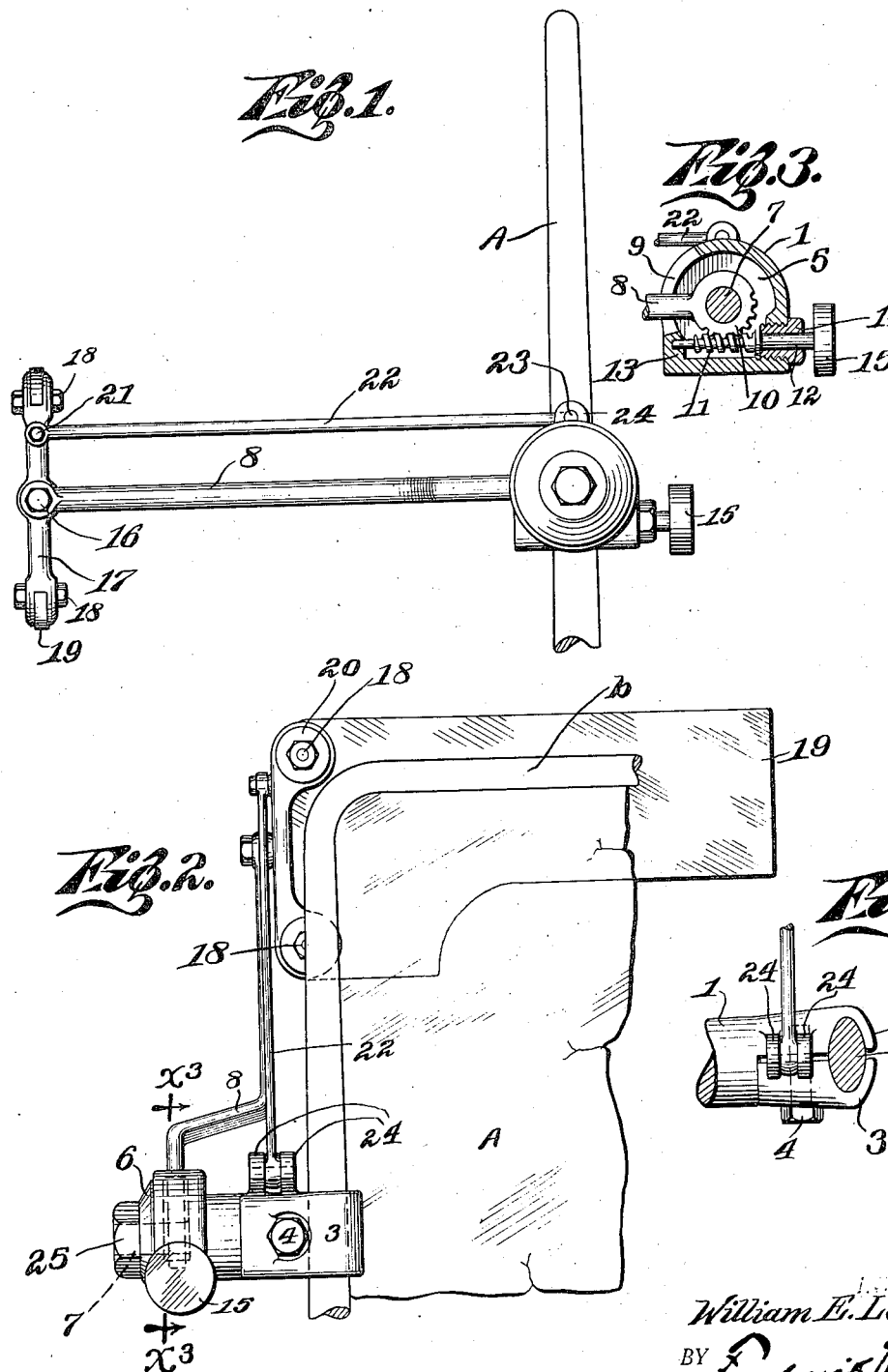

1,454,390

UNITED STATES PATENT OFFICE.

WILLIAM E. LORANGER, OF LOS ALAMITOS, CALIFORNIA.

GLARE SHIELD.

Application filed July 5, 1921. Serial No. 482,316.

*To all whom it may concern:*

Be it known that I, WILLIAM E. LORANGER, a citizen of the United States, and a resident of Los Alamitos, in the county of Orange and State of California, have invented certain new and useful Improvements in Glare Shields, of which the following is a specification.

This invention relates to shields of the character designed to protect the eyes of the driver of a vehicle against the glare produced by the lamps of a vehicle traveling in the opposite direction, or any other lamps that may be in the line of vision of the driver.

An object of the invention is to shield the driver's eyes from the glare while at the same time permitting a practically unobstructed vision so that he will be enabled to see the approaching machine or other object which it is necessary to avoid.

Another object is to provide a device of this character which can be very quickly and easily moved from position in front of the driver's eyes when desired, for example, in the daytime when it is not desired to use the device.

The accompanying drawings illustrate the invention:

Figure 1 is a side view of a glare shield embodying the invention and attached to a wind shield, a fragment of which is also shown.

Figure 2 is an elevation from the right of Figure 1.

Figure 3 is a sectional elevation on line indicated by $x^3$—$x^3$, Figure 2.

Figure 4 is a plan view of the clamp end of the bracket, the frame of the wind shield being shown in cross section.

A wind shield is shown fragmentarily at *a* and the frame *b* of said wind shield supports a bracket 1. In this particular instance the bracket 1 is provided at one end with clamping jaws, a stationary jaw 2 and a movable jaw 3, and the frame *b* of the wind shield is accomodated between said jaws, there being a cap screw 4 passing through the jaw 3 into the jaw 2 to tighten the clamp upon the wind shield frame. Near its other end the bracket 1 is provided with a gear chamber 5 closed at its outer end by a detachable cap 6 held in place by a nut 25 on a stud 7. The stud extends through the chamber 5 and forms a pivot for the inner end of an arm 8 which extends through a slot 9 in the bracket, said slot permitting swinging of the arm 8 upon the pivot 7 so that the outer end of the arm 8 can be elevated or lowered relative to the inner end.

In order that the arm 8 may be adjusted into different angular positions and held in such positions, the inner end of said arm is provided with a segmental gear 10 engaged by a worm 11 on a worm shaft 12, one end of said shaft being journaled in a bearing 13 in the bracket and said shaft projecting through a bushing 14 screw-threaded into the bracket. The projecting end of the shaft 12 is provided with a knob 15 which, when turned by the operator, rotates the gear 10 to swing the arm 8 into different angular positions.

The forward end of the arm 8 is pivoted at 16 to a screen holder 17 which is secured by bolts 18 or otherwise to a light screen 19 constructed of glass or other suitable light transmitting material. The screen 19 is not clear but is darkened or colored slightly so that the glare of an approaching headlight will be destroyed by said screen. The screen 19 may be darkened or colored in the manufacture or the surface thereof may be smoked or otherwise darkened or colored to effect the same result. The color will preferably be merely a slight tint similar to those employed in colored goggles. The screen 19 extends in front of the wind shield and is spaced therefrom by the arm 8.

In the instance shown in the drawings, the bolts 18 pass through spaced ears 20 and the light screen 19 is interposed edgewise between the ears. The light screen 19 is preferably narrower at its free end than at its secured end for a reason that will appear hereinafter.

It is advisable to adjust the light screen to various elevations for different drivers, for the reason that the eyes of some drivers will be on a different level relative to the wind shield than those of other drivers, and thus it will not be necessary to raise and lower the bracket on the wind shield to secure the proper adjustment for different drivers of the same car. Furthermore, it may be advisable at times to adjust the light screen to different elevations in order to properly intercept the rays projected by lamps at different elevations on vehicles which are passing or being passed. The adjustment can be made by turning the knob 15, as hereinbefore described. In order that, when the screen is thus moved into different positions, it may be maintained substantially vertical so as to present a maximum area to the lamps of an oncoming vehicle, I connect the holder 17 by a pivot 21 to a parallel motion rod 22 which is pivoted at 23 between spaced lugs 24 projecting from the top of the bracket 1.

In practice, the light screen will be adjusted to position in front of the wind shield at a point a substantial distance in front of said wind shield, as shown in Figure 1, by appropriate operation of the knob 15. The length of the light screen is sufficient to "cover" both headlights of an approaching vehicle when said vehicle is several hundred feet down the road. As the approaching vehicle gets nearer, the light from the right lamp thereof is thrown sufficiently far to the right to not interfere with the vision of the driver using the light screen on his car. The light from the nearer lamp of the approaching vehicle, that is to say, the left lamp, is, of course, the one that is bothersome to the driver of the first vehicle, and when the glare shield is employed, the path of said left lamp on the light screen will curve downwardly toward the bolt 18 and, in order to "cover" said lamp, the light screen is made approximately of the shape shown in Figure 2 of the drawings. By having the screen relatively narrow for the greater part of its length, the driver's view of practically everything immediately in front of his vehicle is entirely unobstructed.

I claim:

1. In a glare shield, the combination of a light screen, a bracket adapted to be secured to a support, a rod pivotally connected at one end to the screen and at its other end to the bracket, an arm pivotally connected at one end to the light screen and at its other end to the bracket and provided at said other end with a segmental gear, a worm shaft journaled in the bracket and having a worm in mesh with the gear, and means to turn the shaft.

2. In a glare shield, the combination of a light screen, a bracket adapted to be secured to a support, spaced lugs projecting from the top of the bracket, a rod pivotally connected at one end to the screen and at its other end to the lugs, a second arm pivotally connected at one end to the light screen and at its other end to the bracket and provided at said other end with a segmental gear, a worm shaft journaled in the bracket and having a worm in mesh with the gear, and means to turn the shaft.

3. In a glare shield, the combination of a light screen, a bracket provided at one end with clamping means and at its other end with a gear chamber and a slot communicating with the chamber, a rod pivotally connected at one end to the screen and at its other end to the bracket, a second arm pivotally connected at one end to the light screen and projecting through the slot, a stud extending through the gear chamber and pivoting the second arm to the bracket, said second arm having a segmental gear at the stud end, a cap on the stud closing the outer end of the chamber, a nut on the stud to hold the cap in place, a shaft journaled in the bracket and having a worm in mesh with the gear, and means to turn the shaft.

Signed at Los Alamitos, California this 25th day of June, 1921.

WILIAM E. LORANGER.

Witnesses:
D. F. HARNER,
D. B. CARLIN.